United States Patent [19]

Ueda et al.

[11] Patent Number: 5,427,479
[45] Date of Patent: Jun. 27, 1995

[54] CUTTING TOOL

[75] Inventors: Yoshihisa Ueda; Syouji Takiguchi; Akira Kanaboshi, all of Yuuki; Takehiro Ohnishi, Tottori, all of Japan

[73] Assignee: Mitsubishi Materials Corp., Tokyo, Japan

[21] Appl. No.: 231,640

[22] Filed: Apr. 22, 1994

[30] Foreign Application Priority Data

Apr. 23, 1993 [JP] Japan .................................. 5-098172

[51] Int. Cl.⁶ .............................................. B23B 51/00
[52] U.S. Cl. ..................................... 408/158; 408/147; 82/1.4
[58] Field of Search ............... 408/147, 153, 158, 161, 408/169, 172, 83.5; 82/1.4

[56] References Cited

U.S. PATENT DOCUMENTS

| | | | |
|---|---|---|---|
| 3,598,499 | 8/1971 | Dillon, Jr. | 408/153 |
| 3,902,386 | 9/1975 | Dressler et al. | 408/158 |
| 5,044,841 | 9/1991 | Biera et al. | 409/233 |

FOREIGN PATENT DOCUMENTS

| | | | |
|---|---|---|---|
| 1246405 | 10/1960 | France | 408/83.5 |
| 2808610 | 10/1978 | Germany | 408/158 |
| 176703 | 8/1987 | Japan | 408/153 |

*Primary Examiner*—Daniel W. Howell
*Attorney, Agent, or Firm*—Armstrong, Westerman, Hattori, McLeland & Naughton

[57] ABSTRACT

A substantially conical tool body 1 has a groove 11 extending in the direction of generating line. The groove 11 slidably receives a slider 16 carrying a cutting insert 5A. A spacer 12 having serration grooves 12a is interposed between one wall surface 11a of the groove and the slider 16. Serration grooves 16a are formed in one side surface of the slider 16. A wedge member 13 is detachably interposed between the wall surface 11b of the groove 11 and the slider 16 so as to press the slider 16 to bring the serration grooves 12a, 16a into engagement with each other. Any wear and deformation due to cutting load appear on the spacer 12 and the wedge member 13, so that original mounting and positional precision of the slider 16 can easily be recovered by renewing these members, thus maintaining a required level of machining precision.

4 Claims, 4 Drawing Sheets

CUTTING TOOL

BACKGROUND OF THE INVENTION

1. Field of the Invention

The present invention relates to a cutting tool specifically suitable for use in machining of valve bores of a cylinder head of an internal combustion engine.

2. Description of the Related Art

Brims of valve bores formed in an engine cylinder head are frequently impacted by valves. It is, therefore, a common practice to fit a member of a hard material such as a sintered alloy to improve durability of the brim portions of the valve bores. In order to machine such a valve bore, therefore, a cutting tool is used which has both a boring cutting portion such as a gun reamer for finishing the bore itself and a cutting insert for machining the open brim portion of the bore. Usually, the brim of the valve bore is conically-shaped in conformity with the shape of the valve head. In order to machine such a conical brim, the above-mentioned cutting insert is preferably mounted in such a manner as to be slidable in a direction which obliquely intersects the axis of rotation of the cutting tool.

FIGS. 8 and 9 show an example of a conventional cutting tool which is used in machining valve bores of the kind described.

The cutting tool has a generally cylindrical tool body 1 and is mounted through an adapter 2 on, for example, a spindle of a lathe which is not shown, so as to be rotated about the axis O of the spindle. A bush 3 is mounted on the end of the tool body 1 so as to extend along the axis O. The above-mentioned boring tool, such as a gun reamer (not shown), is inserted to the bush 3 at its shank portion, so that the boring tool is fed while being rotated together with the tool body 1, thereby boring and finishing a bore. The feed of the boring tool is effected by means of a shaft which is coaxially received in a slide shaft which will be described later.

Three cutting inserts 5A, 5B, 5C are provided on the outer periphery of the end of the tool body 1. The open brim of the bore is machined by these cutting inserts. FIG. 8 shows only one, 5A, of the cutting inserts, while other cutting inserts, 5B and 5C, are omitted from the drawings.

Among these cutting inserts 5A, 5B and 5C, two cutting inserts 5B and 5C are directly fixed to the tool body 1, while the remaining cutting insert 5A is mounted slidably as explained before. More specifically, a T-shaped groove 6 is formed in the tool body 1 extending in a direction of a generating line of the cone of the tool body 1, i.e., in a direction which obliquely intersects the axis O, as shown in FIG. 8. The T-shaped groove 6 is also shown in FIG. 9. The T-shaped groove slidably receives a slider 7. The above-mentioned cutting insert 5A is detachably fixed to this slider 7.

On the other hand, bores 1a and 2a are formed in the adapter 2 so as to extend along the axis "O". These bores 1a and 2a receive a slide shaft 8 and a coupling member 9, respectively. The coupling member 9 is fitted in these bores through the intermediary of a key 9a, so that the tool body 1 and the coupling member 9 as a unit are rotatable about the axis O. At the same time, the coupling member 9 is slidable back and forth in the bore 1a as the slide shaft 8 is moved back and forth. The T-shaped groove 6 in the tool body 1 communicates with the interior of the bore 1a via a hole 6a which is formed so as to open in the bottom of the T-shaped groove 6. A connector pin 10 which is connected to the slider 7 projects into the bore 1a through the hole 6a. The connector pin 10 has an end received in a slant hole 9b formed in the coupling member 9, so as to interconnect the slider 7 and the coupling member 9, whereby the slider 7 is made to slide along the T-shaped groove 6 in the tool body 1 in accordance with the back and forth movement of the coupling member 9 caused by the movement of the slide shaft 8, thereby causing the cutting insert 5A to slide in a direction which obliquely intersects the axis O.

The machining of a valve bore with this type of cutting tool is conducted in the following manner. A boring tool such as a gun reamer is mounted in the bush 3 and is retracted towards the base end of the tool body 1 by means of the shaft 4. Then, the tool body 1 is fed in the direction of the axis O while being rotated, whereby the open brim of the bore is chamfered by the cutting inserts 5B and 5C. Then, the tool body 1 is slightly retracted and, while the tool body 1 is rotated, the slide shaft 8 and the coupling member 9 are advanced to cause a sliding motion of the cutting insert 5A through the connector pin 10 and the slider 7, whereby a tapered surface is formed on the open brim of the bore. Then, the shaft 4 is operated to forwardly feed the boring tool while the tool body 1 is being rotated, thereby finishing the surface of the valve bore.

PROBLEMS SOLVED BY THE PRESENT INVENTION

When the tapered surface is being formed at the open brim portion of the valve bore, the cutting load acting on the cutting insert 5A is borne by the wall surface of the T-shaped groove through the slider 7, particularly the surface facing the direction of the tool rotation. Consequently, the wall surface of the T-shaped groove is worn down and deformed due to the cutting load during extended use. Wear of the wall surfaces of the T-shape groove is also caused by the slider 7 while it slides along the groove 6.

The wear of the T-shaped groove undesirably allows the slider 7 to have play in the T-shaped groove, with the result that the precision of machining performed by the cutting insert 5A is impaired. More specifically, the locus of the sliding movement of the slider 7 tends to be recessed at a portion where the wall of the T-shaped groove is recessed due to wear, rather than being straight. Consequently, the above-mentioned tapered surface tends to convex at its intermediate portion, failing to have the expected conical form.

Hitherto, when wear of the T-shaped groove occurred, the T-shaped groove was trimmed by, for example, grinding, which resulted in an increased groove width with straight wall surfaces, and, further, a new slider 7 was fabricated in conformity with the size and shape of the trimmed T-shaped groove 6, thus enabling repeated use of the tool body 1.

Such a countermeasure, however, undesirably requires troublesome work, such as trimming of the T-shaped groove 6, as well as fabrication of a new slider 7. Furthermore, redesigning of the slider 7 is required each time it is renewed, in order that the new slider 7 adapts to the size and shape of the T-shaped groove after the trimming. Thus, repeated use of the tool body 1 could also result in economic disadvantage.

In the cutting tool having the described construction, the cutting insert 5A is located via the engagement between the walls of the T-shaped groove 6 and the slider 7 received in the groove 6. Consequently, there is no means for absorbing any dimensional error in the formation of the T-shaped groove 6 and the slider 7. In order to attain a high degree of machining precision, therefore, it is necessary that the T-shaped groove 6 and the slider 7 are formed with a high degree of machining precision which is not easy to attain.

In addition, there is a practical limit in enhancing rigidity of the structure for mounting the slider 7. This also forms one of the causes of play of the slider 7.

SUMMARY OF THE INVENTION

The present invention has been achieved to overcome the above-described problems. According to the present invention, there is provided a cutting tool comprising a substantially conical tool body which is rotatable about its axis, the tool body having a groove formed therein so as to extend in the direction of a generating line, the groove slidably receiving a slider provided with a cutting insert, the tool body accommodating a coupling member which is rotatable as a unit with the tool body and movable back and forth along the axis of the tool body, the coupling member engaging with the slider to cause a sliding movement of a slider, wherein the improvement comprises:

a spacer detachably interposed between one of the opposing wall surfaces of the groove and the slider and having an engaging portion which extends in the direction of the generating line; an engaged portion provided on one side surface of the slider contacting the spacer and engaged by the engaging portion; and a wedge member detachably interposed between the other of the opposing wall surfaces of the groove and the slider, the wedge member being wedged towards the bottom surface of the groove so as to press the slider against the one of the opposing walls, thereby bringing the engaging portion into engagement with the engaged portion.

In the cutting tool of the present invention having the described construction, a spacer and a wedge member are detachably disposed between the slider and the wall surfaces of the groove which slidably receives the slider. The cutting load transmitted from the cutting insert to the slider is borne by the groove wall surface either through the spacer or the wedge member. Consequently, any wear or deformation caused by the cutting load appears on the spacer or the wedge member, as well as any wear attributable to frictional sliding movement of the slider. Trimming of the groove and redesigning and fabrication of the slider, therefore, are not necessary. Thus, according to the present invention, it is possible to maintain the required level of machining precision in quite an easy and economical way, simply by renewing the spacer and the wedge member.

The cutting tool of the present invention may employ a shimming member between the wedge member and the bottom surface of the groove, for the purpose of determining the position of the wedge member so as to enable adjustment of the pressing force applied to one side wall surface of the groove. This makes it possible to adjust the size of the gap between the wedge member and the spacer along which the slider slides, in accordance with the dimensional precision of the slider. It is, therefore, possible to easily deal with any dimensional error incurred in the formation of the groove and the slider.

Preferably, the portions of the spacer and the slider which engage with each other are serrated such that the serration grooves extend in the direction of the aforesaid generating lines, thus increasing the area of contact between the slider and the spacer, thereby enhancing the rigidity of the mount of the slider on the tool body.

BRIEF DESCRIPTION OF THE DRAWINGS

Preferred embodiments of the invention are illustrated in the attached drawings, in which.

DETAILED DESCRIPTION OF THE PREFERRED EMBODIMENTS

Figure 1:
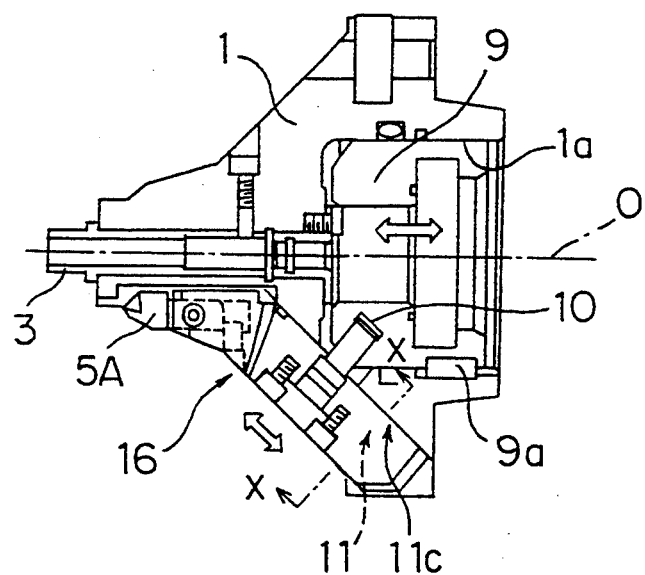
FIG. 1 is a sectional view of a first embodiment of the present invention.
Figure 2:
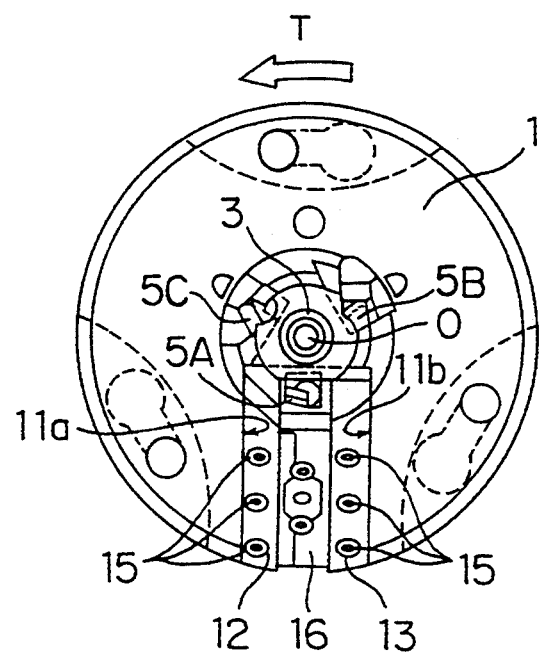
FIG. 2 is a front elevational view of the embodiment shown in FIG. 1.
Figure 3:
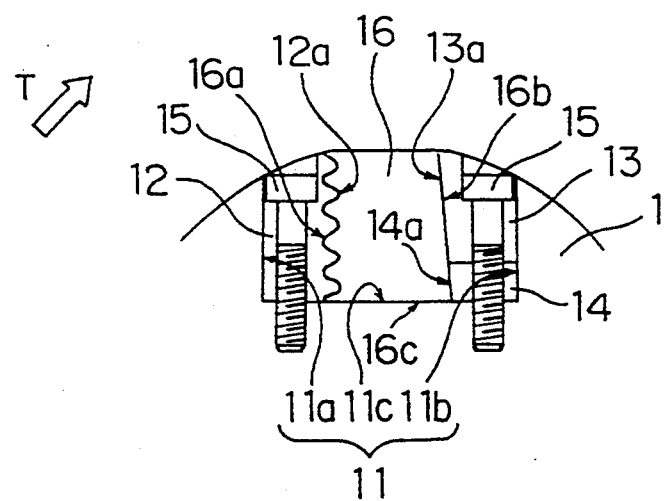
FIG. 3 is sectional view of the embodiment shown in FIG. 1 taken along a line XX.
Figure 8:
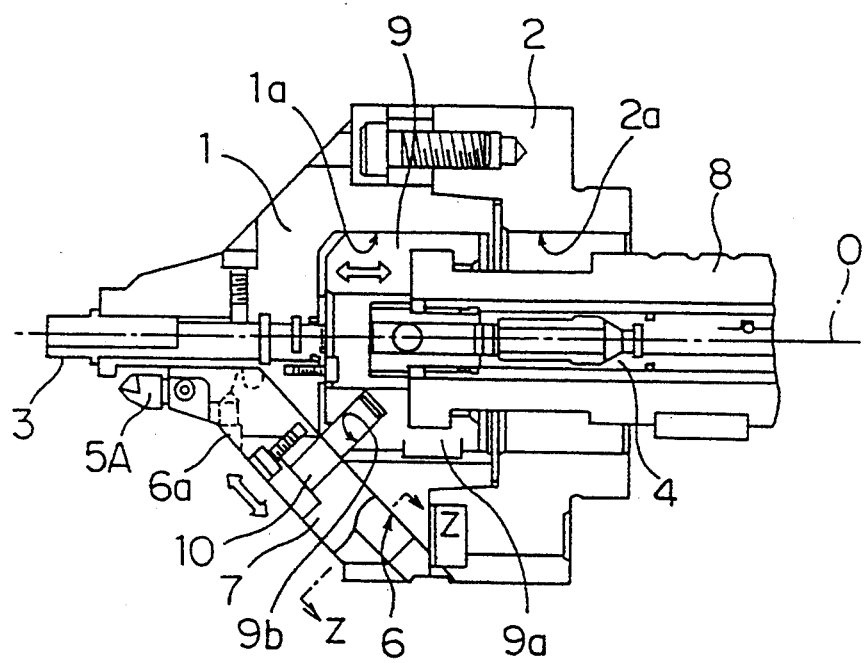
FIG. 8 is a sectional view of a conventional cutting tool.
Figure 9:
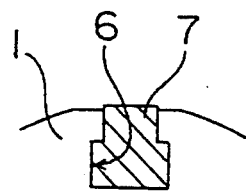
FIG. 9 is a sectional view of the conventional cutting tool taken along the line ZZ.

FIGS. 1 to 3 show an embodiment of the present invention. Basic construction of this embodiment is the same as that of the conventional cutting tool explained before in connection with FIG. 8. Therefore, the same reference numerals are used in FIGS. 1 to 3 to denote the same or like parts to those of the known construction shown in FIG. 8, and detailed description of such parts is omitted. In addition, the adapter 2 and the slide shaft 8 are omitted from FIGS. 1 to 3.

In this embodiment, the tool body 1 having a generally conical form has a groove 11 which is defined by a pair of parallel opposing wall surfaces 11a, 11b and a bottom surface 11c which orthogonally intersects the wall surfaces 11a, 11b, instead of the T-shaped groove 6 which is used in the tool body 1 of the conventional cutting tool. The groove 11 extends in the direction of a generating line of the generally conical tool body 1. A spacer 12 is detachably attached to the wall surface 11a which faces towards the leading side as viewed in the direction T of tool rotation (counterclockwise as viewed in FIG. 2), by means of clamp screws 15. Similarly, a wedge member 13 is detachably attached to the wall surface 11b facing the trailing side as viewed in the direction T of tool rotation, through the intermediary of a shimming member 14, by means of clamp screws 15.

A slider 16 is received in the space defined by the spacer 12, wedge member 13 backed up by the shimming member 14 and the bottom surface 11c of the groove 11, for sliding movement in the direction of the above-mentioned generating line, i.e., in the direction which obliquely intersects the axis O.

The spacer 12 is an elongated member which is formed to extend substantially over the entire length of the groove 11 when mounted on the tool body 1, and is held in close contact with the above-mentioned wall surface 11a and the bottom surface 11c of the groove 11. Referring specifically to FIG. 3, the surface of the spacer 12 facing inwardly of the groove 11, i.e., towards the leading side as viewed in the direction of the tool rotation T, is serrated so as to have serration grooves 12a which extend in the direction of the above-mentioned generating lines, thus providing an engaging portion which is one of the features of this embodiment.

The wedge member 13 and the shimming member 14 also are shaped to extend substantially over the entire length of the groove 11 when mounted on the tool body 11, as is the case of the spacer 12. As will be seen from FIG. 3, the wedge member 13 is disposed on the outer peripheral side of the tool body 1, while the shimming member 14 is disposed adjacent to the bottom surface 11c of the groove 11. The wedge member 13 and the shimming member 14 are disposed in close contact with the wall surface 11b. The side surfaces 13a and 14a of the wedge member 13 and the shimming member 14 facing inwardly of the groove 11, i.e., towards the trailing side viewed in the direction T of tool rotation, are flush with each other and are so tapered as to approach the side wall surface 11b of the groove 11 towards the bottom surface 11c.

The slider 16 is a columnar member having a polygonal cross-section and bent at an intermediate portion thereof as shown in FIG. 1. The slider 16 has a base end which is received in the groove 11 and a free end to which is detachably attached the above-mentioned cutting insert 5A.

The side surface of the base end portion of the slider 16, which faces the above-mentioned wall surface 11a when the slider 16 is mounted on the tool body 1, is serrated to exhibit a corrugated cross-section so as to have serration grooves 16a which closely engage with the serration grooves 12a of the spacer 12, thus providing the engaged portion which also is one of the features of this embodiment. The other side surface 16b of the slider 16 which faces the wall surface 11b opposite to the wall surface 11a is tapered in conformity with the taper of the side surfaces 13a, 14a of the wedge member 13 and the shimming member 14 so as to be spaced apart from the side surface having the serration grooves 16a towards the bottom surface 11c of the groove 11. As shown in FIG. 3, the slider 16 is slidably fitted in the aforementioned space in such a manner that its serration grooves 16a engage with the serration grooves 12a of the spacer 12 and that the above-mentioned other side surface 16b is held in close contact with the side surfaces 13a, 14a of the wedge member 13 and the shimming member 14 and the bottom face 16c is held in close contact with the bottom surface 11c of the groove 11.

This embodiment also has three cutting inserts 5A, 5B and 5C, one 5A of which is mounted on the slider 16 for sliding movement. The other two cutting inserts 5B and 5C are fixed to the end of the tool body 1 as shown in FIG. 2. Three cutting inserts 5A, 5B and 5C are arranged at an equal interval in the circumferential direction of the tool body 1 with offsets in the direction of the axis O of the tool body 1.

Figure 4:
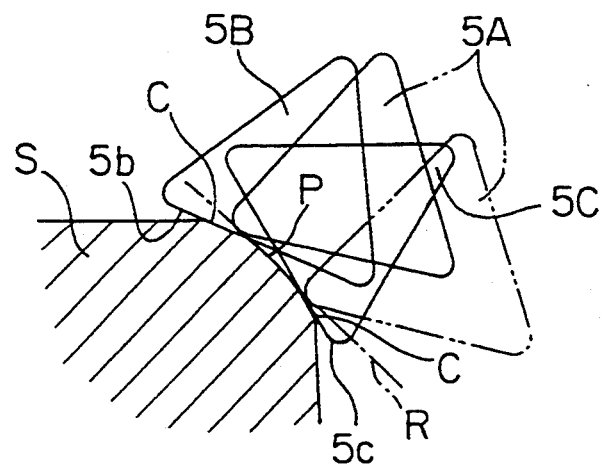
FIG. 4 is an illustration of loci of rotation of cutting inserts 5A, 5B, 5C used in the embodiment shown in FIG. 1 about an axis O.

FIG. 4 shows the loci of rotation of the cutting inserts 5A, 5B and 5C about the axis O. As will be seen from this figure, the above-mentioned two cutting inserts 5B and 5C are so arranged that the loci of the cutting edges 5b and 5c which are presented for the cutting intersect each other at an obtuse angle. In addition, the cutting insert 5A is so disposed that the locus of rotation of the cutting edge 5a of the cutting insert 5A is moved in accordance with the sliding movement of the slider 16, along a path R which is between the above-mentioned cutting edges 5b, 5c and which intersects these cutting edges 5b, 5c at obtuse angles.

In the use of the cutting tool having the described construction, the tool body 1, with a boring tool such as a gun reamer attached to the end thereof, is mounted on the free end of a spindle of a lathe through an adapter, so as to be subjected to a cutting operation.

More specifically, after the boring tool is retracted towards the base end, the tool body 1 is fed forward along the axis O of the tool body 1 while being rotated about the axis O, thereby forming chamfer surfaces C, C at the open brim of the bore by means of the cutting inserts 5B, 5C. In FIG. 4, a symbol S denotes a member of a hard material such as a sintered alloy fitted in the open brim of the valve bore as explained before.

After the chamfer surfaces C, C are formed, the tool body is slightly retracted while being rotated, and the slide shaft which is not shown is projected forward to advance the coupling member 9, whereby the slider 16 is made to slide in the direction of the generating line through the action of the connector pin 10, causing the cutting insert 5A to move along the path R of movement, whereby a tapered surface P is formed on the open brim of the bore.

Subsequently, the boring tool, such as a gun reamer, is advanced into the valve bore, while the tool body 1 is being rotated, thereby finishing the valve bore.

During the cutting of the tapered surface P by the cutting tool having the described construction, the cutting load acting on the cutting insert 5A is borne through the slider 16 mainly by the spacer 12 which is disposed on the trailing side of the cutting insert 5A as viewed in the direction of the tool rotation. Consequently, the cutting load causes wear or deformation of the spacer 12, without causing wear and deformation of the groove 11, i.e., without damaging the tool body 1. The frictional sliding motion of the slider 16 only causes wear of the spacer 12, wedge member 13 and/or the shimming member 14, without causing any damage on the tool body 1.

The spacer 12, wedge member 13 and the shimming member 14 are detachably attached to the tool body 1 by means of the clamp screws 15. These members, when worn down, can easily be detached and replaced with new members, thus enabling very easy recovery of the precision of the machining to be achieved by the cutting tool. The shapes and sizes of these new members may be the same as those of the members originally used on the cutting tool, which eliminates the necessity for redesigning which, hitherto, has been necessary each time the parts became unusable due to wear. Thus, offering great advantages, such as from the view point of economy. This advantage also applies to the renewal of the slider 16.

In the cutting tool having the described construction, the slider 16 is pressed against the wall surface 11a of the groove 11 by means of the wedge member 13, with the serration grooves 16a thereof held in engagement with the serration grooves 12a of the spacer 12, whereby the engagement between the serration grooves 12a, 16a is enhanced to improve the positional precision of the cutting insert 5A.

In the illustrated embodiment, the degree of pressing of the slider 16 by the wedge member 13 is adjustable by varying the thickness of the shimming member 14 interposed between wedge member 13 and the bottom surface 11c of the groove 11. Namely, when the shimming member 14 is replaced with another shimming member having a different thickness, the position to which the wedge member 13 is forced into the groove 11 is changed to bring the slider 16 into pressure contact with a different portion of the slanted side surface 13a, without causing a change in the orientation of the slider 16.

Thus, the described embodiment, through selection of the thickness of the shimming member, can easily deal with the problem of play of the slider 16 which may be caused by a difference between the width of the slider 16 and the width of the gap between the wedge member 13 and the shimming member 14 due to, for example, dimensional error incurred during formation of the spacer 12 and the slider 16. It is, therefore, possible to ensure smooth sliding motion of the slider 16 while preserving mounting precision of the slider 16.

In the described embodiment, the engaging portion of the spacer 12 and the engaged portion of the slider 16 are constituted by serration grooves 12a, 16a which closely engage with each other. Consequently, a greater area of contact is obtained between the spacer 12 and the slider 16, thus enhancing the rigidity of the mounting of the slider 16. It is, therefore, possible to further improve the positioning precision of the cutting insert 5A and, hence, to further improve the precision of machining to be achieved by the cutting tool.

In the illustrated embodiment, the engaging portion and the engaged portion each constitute setrations having a corrugated cross-section. This, however, is only illustrative and the serrations may be formed to present a continuous saw-teeth shaped cross-section. Such a different cross-section of the serrations also enhances the area of contact between the spacer 12 and the slider 16, so as to provide sufficiently large rigidity of the mounting of the slider 16.

Figure 5:
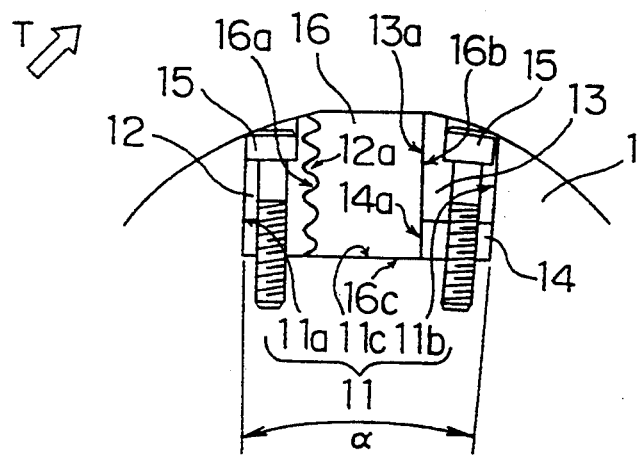
FIG. 5 is a sectional view of a second embodiment of the present invention, corresponding to the section taken along the line XX.

Furthermore, in the illustrated embodiment, the opposing wall surfaces 11a, 11b of groove 11 are formed to extend in parallel with each other, while the side surfaces 13a, 14a of the wedge member 13 and the shimming member 14, as well as the mating side surface of the slider 16, are tapered so that the slider 16 can be pressed by the wedging action of the wedge member 13. This arrangement, however, is only illustrative and may be changed or modified as in a second embodiment which is shown in FIG. 5. Namely, in the second embodiment of the present invention, the wall surface 12b is tapered in such a manner as to approach the opposing wall surface 11a towards the bottom surface 11c of the groove 11, while the slider 16 is so formed that, when mounted on the tool body 1, the side surface 16b of the slider 16 extends in parallel with the wall surface 11a. This embodiment offers an advantage in that the slider 16 can be fabricated easily because it is not required to have any tapered surface.

Preferably, the angle α formed between the extensions of the wall surfaces 11a, 11b of the grove 11 is determined to fall within the range of from 3° to 20°. In FIG. 5, parts or members which are the same as or equivalent to those used in the embodiment shown in FIG. 3 are denoted by the same reference numerals as those appearing in FIG. 3.

Figure 6:
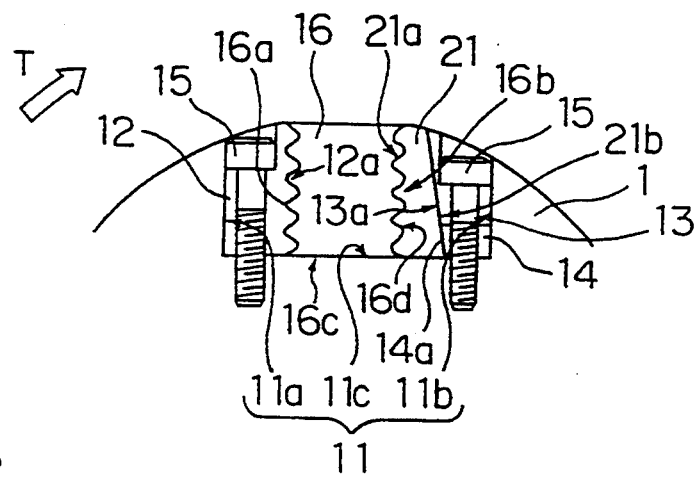
FIG. 6 is a sectional view of a third embodiment of the present invention, corresponding to the section taken along the line XX.

FIG. 6 shows a third embodiment of the present invention. This embodiment is different from the first embodiment shown in FIG. 4 in that (a) a second spacer 21 is interposed between the slider 16 and the combination of the wedge member 13 and the shimming member 14, and that (b) second serration grooves 21a, 16a are formed in opposing surfaces of the second spacer 21 and the slider 16 for close and tight engagement with each other. The side surface 21b of the second spacer 21 opposite to the second serration grooves 21a is tapered in conformity with the taper of the side surfaces 13a, 14a of the wedge member 13 and the shimming member 14.

Obviously, the third embodiment of the cutting tool having the described construction offers the same advantages as those derived from the first embodiment of the cutting tool described before. In addition, the third embodiment presents an additional advantage in that the rigidity of mounting of the slider 16 on the tool body 1 is further enhanced by virtue of the fact that the slider 16 is held at both side surfaces which have serration grooves 16a, 16d.

Figure 7:
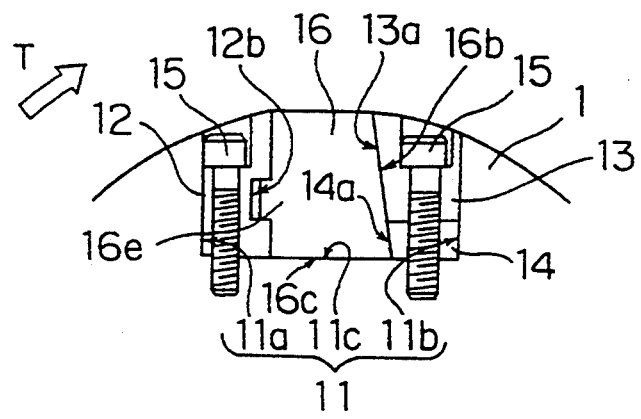
FIG. 7 is a sectional view of a fourth embodiment of the present invention, corresponding to the section taken along the line XX.

In each of the first to third embodiments as described, the slider 16 is received in the groove 11 through the intermediary of the spacer 12, employing mutual engagement between serration grooves such as the grooves 12a and 16a. Serrating the side surfaces of the slider 16 and the spacer 12, however, is not essential and, when the cutting load is not so heavy, may be substituted by a combination of a keyway 12b formed in the spacer 12 to serve as the engaging portion and a protrusion 16c formed on the slider 16 to serve as the engaged portion, as in the fourth embodiment shown in FIG. 7. In the fourth embodiment, the engaging and engaged portions can be formed very easily. Obviously, the engaging and engaged portions may be replaced with each other such that the engaging portion is constituted by a protrusion while the engaged portion is constituted by a mating keyway.

As will be understood from the foregoing description, according to the present invention, any wear and deformation due to the application of a cutting load transmitted from the cutting insert via the slider or due to abrasive sliding motion of the slider are caused on the spacer and the wedge member which are interposed between the slider and the opposing wall surfaces of the groove. When the spacer and/or the wedge member has been worn down, such a worn part can easily be replaced with a new part so as to recover the original mounting and positioning precision of the slider, thus maintaining the expected precision of the machining performed by the cutting tool. In addition, the specifications of the slider and the wedge member need not be changed each time these members are replaced with new ones, thus offering an advantage also from the view point of economy.

Furthermore, the shimming member interposed between the wedge member and the bottom surface of the groove permits an easy adjustment of the width of the portion where the slider slides, thus providing feasible means for easily absorbing any dimensional error incurred during formation of the groove and the slider. Furthermore, a higher degree of mounting precision of the slider is attained by virtue of the increased area of contact between the spacer and the slider presented by the serration grooves serving as the engaging and engaged portions.

It will be apparent to those skilled in the art that the embodiments described may be varied, such as to meet particular specialized requirements, without departing from the true spirit and scope of the invention as claimed.

What is claimed is:

1. A cutting tool comprising a substantially conical tool body which is rotatable about its axis, said tool body having a groove formed therein which extends in the direction of a generating line, said groove slidably receiving a slider provided with a cutting insert, said tool body accommodating a coupling member rotatable as a unit with said tool body and movable back and forth along said axis, said coupling member engaging with said slider to cause the sliding movement of said slider, wherein the improvement comprises:

a spacer detachably interposed between one of the opposing wall surfaces of said groove and said slider and having an engaging portion which extends in the direction of said generating line; an engaged portion provided on one side surface of said slider contacting said spacer and engaged by said engaging portion; and a wedge member detachably interposed between the other of said opposing wall surfaces of said groove and said slider, said wedge member being wedged towards the bottom surface of said groove so as to press said slider against said one of the opposing walls, thereby bringing said engaging portion into engagement with said engaged portion.

2. A cutting tool according to claim 1, further comprising a shimming member interposed between said wedge member and said groove so as to determine the position to which said wedge member is wedged, thereby adjusting the force at which said slider is pressed against said one of the opposing walls of said groove.

3. A cutting tool according to claim 1, wherein said engaging portion and said engaged portion include mating serrating grooves extending in the direction of said generating line.

4. A cutting tool according to claim 2, wherein said engaging portion and said engaged portion include mating serrating grooves extending in the direction of said generating line.

* * * * *